United States Patent
Fulzele et al.

(10) Patent No.: US 9,402,241 B2
(45) Date of Patent: Jul. 26, 2016

(54) METHOD AND APPARATUS FOR DATA STREAM REGISTRATION SWITCHING

(71) Applicant: GOOGLE TECHNOLOGY HOLDINGS LLC, Mountain View, CA (US)

(72) Inventors: Dipti Dipak Fulzele, Bangalore (IN); Jilji N Elayath, Bangalore (IN); Rajesh Kumar, Bangalore (IN)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 14/312,758

(22) Filed: Jun. 24, 2014

(65) Prior Publication Data

US 2015/0373661 A1 Dec. 24, 2015

(51) Int. Cl.
*H04W 4/00* (2009.01)
*H04W 60/00* (2009.01)
*H04L 29/06* (2006.01)
*H04W 88/06* (2009.01)
*H04W 8/18* (2009.01)
*H04W 76/02* (2009.01)

(52) U.S. Cl.
CPC ............ *H04W 60/005* (2013.01); *H04L 65/60* (2013.01); *H04W 8/18* (2013.01); *H04W 76/025* (2013.01); *H04W 88/06* (2013.01)

(58) Field of Classification Search
CPC ... H04W 88/06; H04W 60/00; H04W 60/005; H04L 65/60
See application file for complete search history.

(56) References Cited

U.S. PATENT DOCUMENTS

| | | | | |
|---|---|---|---|---|
| 2013/0156081 A1* | 6/2013 | Tat et al. | | 375/222 |
| 2013/0215869 A1* | 8/2013 | Srinivasan et al. | | 370/331 |
| 2014/0273974 A1* | 9/2014 | Varghese et al. | | 455/412.1 |
| 2014/0370892 A1* | 12/2014 | Gottimukkala et al. | | 455/435.1 |
| 2015/0023258 A1* | 1/2015 | Hu et al. | | 370/329 |
| 2015/0094071 A1* | 4/2015 | Hang et al. | | 455/450 |
| 2015/0119103 A1* | 4/2015 | Ngai et al. | | 455/552.1 |
| 2015/0162941 A1* | 6/2015 | Ghosh et al. | | 370/331 |

FOREIGN PATENT DOCUMENTS

EP 2437528 B1 7/2013
WO 2010140781 A2 12/2010

OTHER PUBLICATIONS

Auto Data Switch, Amol Pophale, https://play.google.com/store/apps/details?id=com.amol.ads, Published on Google Play May 31, 2013.

* cited by examiner

*Primary Examiner* — Ajit Patel
(74) *Attorney, Agent, or Firm* — Morris & Kamlay LLP

(57) ABSTRACT

A method on a mobile device is described. A first registration of the mobile device is maintained with a first wireless network for a first subscription. A second registration of the mobile device is maintained with a second wireless network for a second subscription. The first registration is concurrent with the second registration. A user data stream is transferred with the second registration. The user data stream is transferred from the second registration to the first registration based on a receipt of a call request.

20 Claims, 9 Drawing Sheets

100

METHOD AND APPARATUS FOR DATA STREAM REGISTRATION SWITCHING

CROSS-REFERENCE TO RELATED APPLICATION

The present application claims priority to U.S. Provisional Patent Application 61/971,024, filed Mar. 27, 2014, the contents of which are hereby incorporated by reference herein.

TECHNICAL FIELD

The present disclosure is related generally to wireless network communication and, more particularly, to call and data handling for mobile devices with multiple registrations.

BACKGROUND

Mobile devices can be configured with multiple subscriber identity modules ("SIMs"), commonly dual SIMs. The Dual SIM devices allow a user to have a single mobile device for use in several countries. For example, where the user commutes between two countries, the user can have a subscription with a wireless network operator in each country to provide calls with a more economical rate. Dual SIM devices also allow a user to have both a work or professional number associated with a first SIM and a personal or private number associated with a second SIM on the same mobile device.

Some Dual SIM mobile devices may be referred to as Dual SIM Dual Standby ("DSDS") devices. The DSDS device can be active (e.g., registered) on two wireless networks simultaneously in a standby mode. In a dedicated mode, the DSDS device is active only on the wireless network on which it is in a "connected" mode for handling a call. Other mobile devices may be referred to as Dual SIM Dual Active ("DSDA") devices. The DSDA devices can be active on two wireless networks while handling a call.

Where a Dual SIM device is registered with a 3G-compatible wireless network, the Dual SIM device may allow data transfer over a packet-switched connection concurrently with a voice call over a circuit-switched connection. However, where the Dual SIM device is registered with a 2G-compatible wireless network, the Dual SIM device may allow only one a data transfer or voice call to be performed. In some cases, a user may not be aware of the capability for both voice and data on the 3G-compatible wireless network. Thus, when the user has an ongoing data transfer on the 2G-compatible wireless network, the user may pause the data transfer in order to handle a call on the 2G-compatible wireless network.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
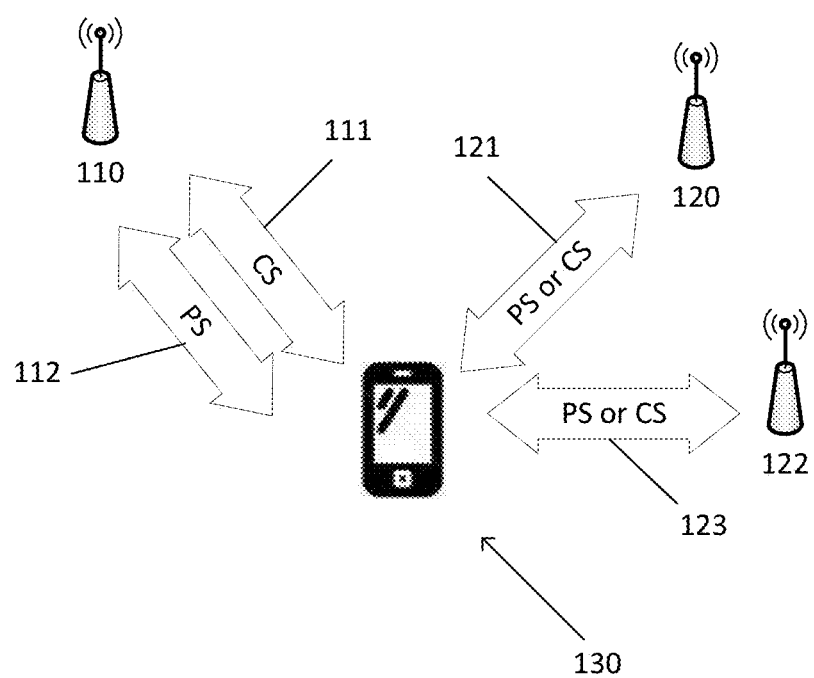
FIG. 1 is a diagram of a communication system in which the methods of this disclosure may be practiced, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Instead of pausing or disconnecting a user data stream when a call is received, the user data stream can be switched to another registration (e.g., another subscription). The present disclosure describes methods and devices that allow for switching a registration for a data transfer. This technique helps to improve a user experience on a mobile device with multiple subscriber identity modules by allowing for concurrent handling of a voice call and a user data stream.

One embodiment includes a method on a mobile device for switching a registration for a data transfer. A first registration of the mobile device is maintained with a first wireless network for a first subscription. A second registration of the mobile device is maintained with a second wireless network for a second subscription. The first registration is concurrent with the second registration. A user data stream is transferred with the second registration. The user data stream is transferred from the second registration to the first registration based on a receipt of a call request.

Another embodiment includes a method on a mobile device. A first registration of the mobile device is maintained with a 3G-compatible wireless network for a first subscription and a second registration of the mobile device is concurrently maintained with a 2G-compatible wireless network for a second subscription. A data registration is determined for a current user data transfer of the mobile device as one of the first registration or the second registration upon receipt of a call request. A call registration is selected as one of the first registration or the second registration based on the data registration. A call for the call request is handled using the call registration.

Another embodiment includes a mobile device for a wireless network. The mobile device includes a non-transitory memory, a processor configured to retrieve instructions from the memory, a first subscriber identity module ("SIM"), and a second SIM. The mobile device is configured to: maintain a first registration with a first wireless network for the first SIM; maintain a second registration with a second wireless network for the second SIM concurrently with the first registration; transfer a user data stream with the second registration; and switch the user data stream from the second registration to the first registration based on a receipt of a call request.

Turning to FIG. 1, a diagram 100 of a communication system that includes a first wireless network 110, a second wireless network 120, and a mobile device 130. In the embodiment shown in FIG. 1, the first wireless network 110 is a 3G-compatible wireless network and the second wireless network 120 is a 2G-compatible wireless network. In other embodiments, the communication system can include the second wireless network 120 and a third wireless network 122 where the third wireless network 122 is also a 2G-compatible wireless network. Possible implementations of the first wireless network 110 include a Universal Mobile Telecommunication System ("UMTS") network, Code Division Multiple Access 2000 ("CDMA2000") network, Enhanced Voice-Data Optimized ("EVDO") network, International Mobile Telecommunications-2000 ("IMT-2000") compatible network, Enhanced Data Rates for Global System for Mobile Communications Evolution ("EDGE") network, or the like. Possible implementations of the second wireless network 120 or third wireless network 122 include a Global System for Mobile Communications ("GSM") network, Interim Standard 95 ("IS-95" or "cdmaOne") network, or the like. While only a single network entity is illustrated for the first, second, and third wireless networks 110, 120, and 122 in FIG. 1, additional network entities have been omitted for clarity and those skilled in the art will understand that additional network entities may be present, such as base stations, node Bs, mobile switching centers, gateway general packet radio service support nodes, and the like.

The first wireless network 110 is capable of handling a voice call for a mobile device over a first communication path 111 (e.g., a circuit-switched path) concurrently with handling a user data stream for the mobile device over a second communication path 112 (e.g., a packet-switched path). A user of the mobile device with a registration to the first wireless network 110 can thus transfer a user data stream while on a call. Other implementations of the first wireless network 110 capable of concurrently handling a voice call and a user data stream for a mobile device will be apparent to those skilled in the art. The second and third wireless networks 120 and 122 are capable of handling either a voice call or a user data stream for a mobile device over respective communication paths 121 and 123. Thus, if a mobile device is currently transferring a user data stream while registered with only the second wireless network 120, the user data stream is postponed in order to handle a voice call over the communication path 121.

The user data stream can include data related to downloading a web page, sending an e-mail, sending or receiving files, downloading applications, or the like. The user data stream can also include background data transfers and data streams that are not necessarily initiated by the user, such as an application update or firmware update. Thus, the user data stream can include any form of user plane data.

The first, second, and third wireless networks 110, 120, and 122 are managed by one or more network operators. A single network operator may manage both the first and second wireless networks 110 and 120, thus allowing a user having a subscription with that network operator to use wireless services provided by the first and second wireless networks 110 and 120, either separately or concurrently. In other implementations, each of the first, second, and third wireless networks 110, 120, and 122 are managed by separate network operators. Other arrangements of network operators will be apparent to those skilled in the art.

Figure 2:
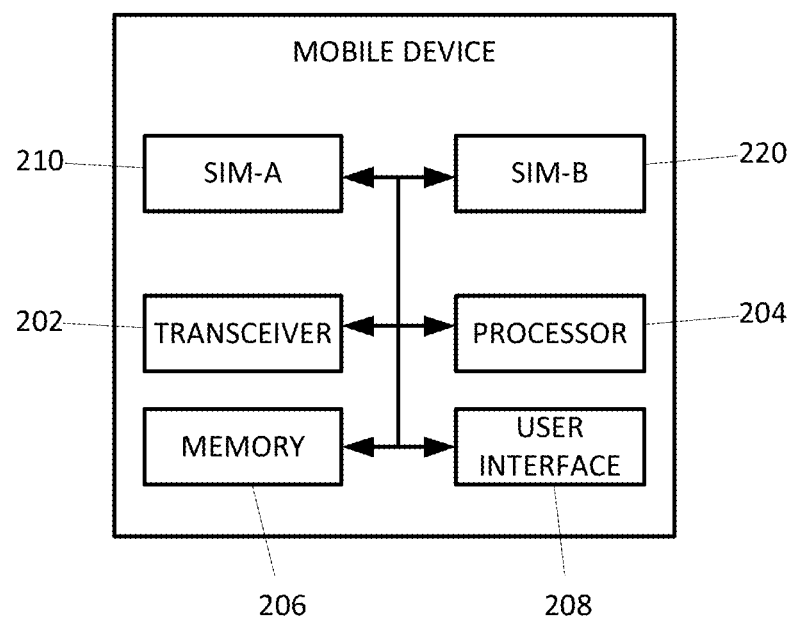
FIG. 2 is a generalized schematic of a mobile device of the communication system of FIG. 1.

Turning to FIG. 2, a block diagram 200 depicts a possible implementation of the mobile device 130 of FIG. 1. The mobile device 130 includes a transceiver 202 configured to transmit signals or data to and receive signals or data from other devices such as the first or second wireless networks 110 or 120. The mobile device 130 also includes a processor 204 that executes stored programs and at least one memory 206. The processor 204 writes data to and reads data from the memory 206. The mobile device 130 includes a user interface 208 having a keypad, display screen, touch screen, microphone, speaker, or the like. During operation, the transceiver 202 receives data from the processor 204 and transmits RF signals representing the data via an antenna (not shown). Similarly, the transceiver 202 receives RF signals via the antenna, converts the RF signals into appropriately formatted data, and provides the data to the processor 204. The processor 204 retrieves instructions from the memory 206 and, based on those instructions, provides outgoing data to, or receives incoming data from the transceiver 202.

In an embodiment, the user interface 208 displays the output of various application programs executed by the processor 204. The user interface 208 additionally includes on-screen buttons that the user can press in order to cause the mobile station to respond. The content shown on the user interface 208 is generally provided to the user interface at the direction of the processor 204. Similarly, information received through the user interface 208 is provided to the processor 204, which may then cause the mobile station to carry out a function whose effects may or may not necessarily be apparent to a user.

The mobile device 130 also includes two or more subscriber identity modules ("SIMs"), such as SIM-A 210 and SIM-B 220. In one embodiment, the mobile device 130 is a Dual SIM Dual Standby ("DSDS") device. In another embodiment, the mobile device 130 is a Dual SIM Dual Active ("DSDA") device. The mobile device 130 may include additional instances of the transceiver 202, processor 204, memory 206, or other components to provide the features of a DSDS or DSDA device, as will be apparent to those skilled in the art.

A user of the mobile device 130 has two or more subscriptions for wireless voice and data service from at least one wireless network operator. For example, the user has a first subscription that corresponds to the SIM-A 210 and a second subscription that corresponds to the SIM-B 220. The first and second subscriptions can be for different phone numbers using different wireless network operators or for a same wireless network operator (e.g., different phone numbers through the same network provider). The mobile device 130 maintains one or more registrations with wireless networks (e.g., camps on the wireless network) using the first and second subscriptions in order to listen for paging messages from the wireless networks. For example, the mobile device 130 can maintain a first registration with the first wireless network 110 using the first subscription (e.g., SIM-A 210). Alternatively, where the first wireless network 110 and the third wireless network 122 are managed by a same network operator, the mobile device can maintain a first registration with the first wireless network 110 or with the third wireless network 122 using the first subscription (e.g., SIM-A 210). In this example, the mobile device 130 can have either a 3G registration (via the first wireless network 110) or a 2G registration (via the third wireless network 122) using the first subscription.

When the mobile device 130 transfers a user data stream, the mobile device 130 uses a data registration for the transfer. As described herein, the mobile device 130 can select one of the first or second registrations as the data registration (e.g., one of the SIM-A 210 or SIM-B 220). When the mobile device 130 handles a call for a call request (e.g., the user makes or receives a call), the mobile device 130 uses a call registration. As described herein, the mobile device 130 can select one of the first or second registrations as the call registration. The mobile device 130 is configured to switch the data registration from the first registration to the second registration, or from the second registration to the first registration, based on a receipt of a call request. Thus, the mobile device 130 can transfer the user data stream using the second registration (e.g., via the second wireless network 120) and then switch the user data stream to the first registration such that the user data stream continues using the first wireless network 110.

Figure 3:
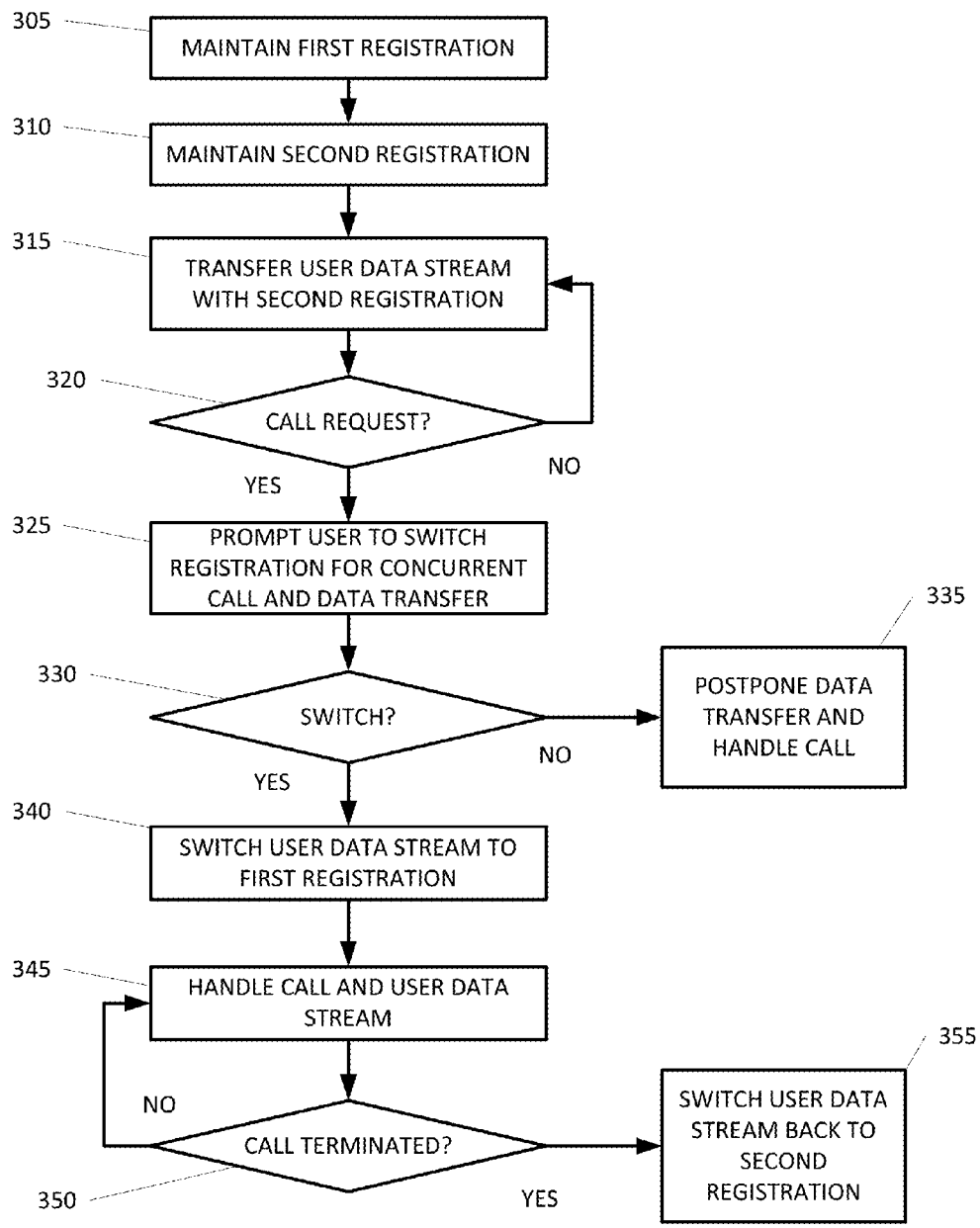
FIG. 3 is a flowchart illustrating a method for switching a registration for a data transfer that may be performed by the mobile device of FIG. 1, according to an embodiment.
Figure 4A:
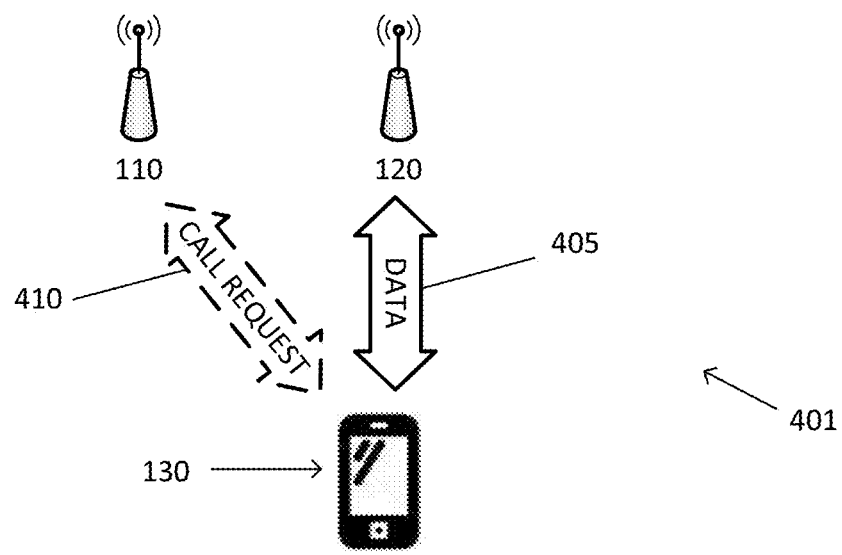
FIG. 4A and FIG. 4B are diagrams illustrating communication paths between the mobile device of FIG. 1 and wireless networks of the communication system of FIG. 1, according to various embodiments.
Figure 4B:
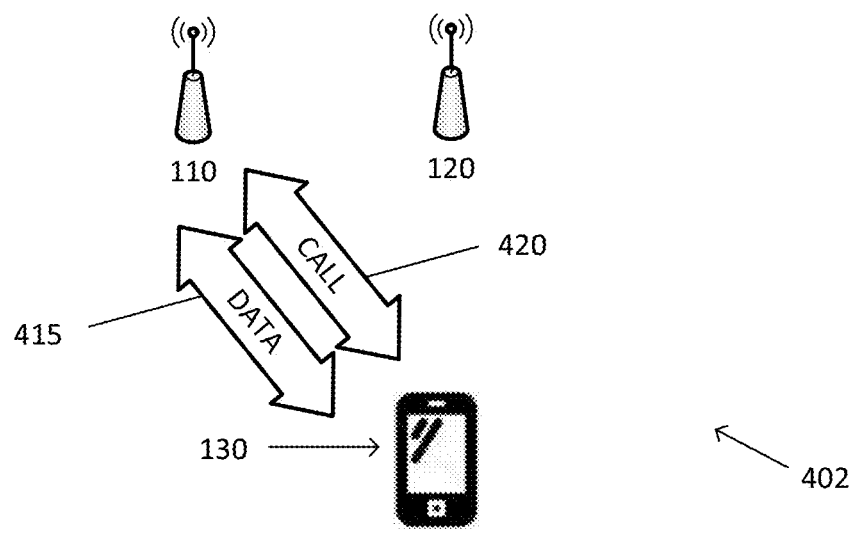

Turning to FIG. 3, a flowchart 300 illustrates a method for switching a registration for a data transfer that may be performed by the mobile device 130. Turning to FIG. 4A and FIG. 4B, diagrams 401 and 402 illustrate examples of communication paths according to an embodiment. The mobile device 130 maintains (305) a first registration with the first wireless network 110 for the first subscription. The mobile device 130 maintains (310) a second registration with the second wireless network 120 for the second subscription. In this case, the first registration is a 3G registration (e.g., with a 3G-compatible network), the second registration is a 2G registration (e.g., with a 2G-compatible network or radio access technology), and the mobile device 130 is a DSDS device. As a DSDS device, the mobile device 130 is capable of transferring a user data stream via the first registration (a 3G registration) while handling a call on the first registration or the second registration.

The mobile device 130 transfers (315) a user data stream with the second registration via the second wireless network 120, for example, via communication path 405 (e.g., analogous to communication path 121). Thus, the data registration is the second registration. While transferring the user data stream, the mobile device 130 determines (320) whether a call request 410 has been received. If no call request is received (NO at 320), then the mobile device 130 continues to transfer the user data stream with the second registration.

If the call request 410 is received (YES at 320), the mobile device 130 prompts (325) the user of the mobile device 130 (e.g., via the user interface 208) for a registration selection to switch the data registration in order to allow a call for the call request 410 and the user data transfer to be handled concurrently. The prompt (325) can be a prompt for selection of a data registration for the user data stream, a prompt for selection of a call registration for the call request, a prompt for concurrent handling of the user data stream and the call, or the like. In this case, the mobile device 130 is a DSDS device and thus cannot handle both the user data stream and the call via the second wireless network 120 (a 2G-compatible wireless network) and cannot handle both the user data stream via the second wireless network 120 and the call via the first wireless network 110. However, the mobile device 130 can handle a user data stream via the first registration (a 3G registration) while concurrently handling a call via the first registration or a call via the second registration. While the call request 410 is illustrated as a call request for the first wireless network 110, in other embodiments the call request can be for the second wireless network 120 or the third wireless network 122, as will be apparent to those skilled in the art.

If the user declines the prompt to switch (NO at 330), then the mobile device 130 postpones (335) the transfer of the user data stream and handles the call (e.g., using the communication path 405 for the call). In other embodiments, the prompt (325) can be provided prior to the receipt of the call request 410. For example, the mobile device 130 can provide the prompt (325) upon starting the transfer of the user data stream. In another example, the mobile device 130 provides a user interface for configuration of the mobile device 130. The user interface allows the user to provide a preselected user preference for switching the user data stream to another registration (e.g., during an initialization or configuration of the mobile device 130). In this case, the mobile device 130 determines the preselected user preference without prompting the user upon receipt of the call request. The preselected user preference can also be selected by a subscriber or owner of the mobile device 130 who is not necessarily the user of the mobile device 130 (e.g., a business entity for an employee's work phone number or a parent of a child).

If the user accepts the prompt or has provided a preselected user preference to switch the user data stream (YES at 330), the mobile device 130 switches (340) the user data stream from the second registration (e.g., communication path 405) to the first registration (e.g., communication path 415). Where the user has provided a preselected user preference, the mobile device 130 automatically switches the user data stream (e.g., without user interaction during the transfer of the user data stream). In this case, the user's experience may be improved by avoiding disruption of the user data stream. The mobile device 130 then handles (345) the user data stream with the first registration concurrently with a call for the call request on the first registration (e.g., via communication path 420). While the call is illustrated on communication path 420, in other embodiments the mobile device 130 can handle the call on the communication path 405 via the second registration, concurrently with the user data stream via the first registration, as will be apparent to those skilled in the art.

The mobile device 130 determines (350) whether the call has been terminated. If the call has not ended (NO at 350), the mobile device 130 continues to handle (345) the call and the user data stream. Upon termination of the call (YES at 350), the mobile device 130 switches (355) the user data stream from the first registration back to the second registration. In other embodiments, the mobile device 130 can prompt the user to switch the user data stream back upon termination of the call or provide a user interface for a preselected user preference for the switch.

Figure 6:
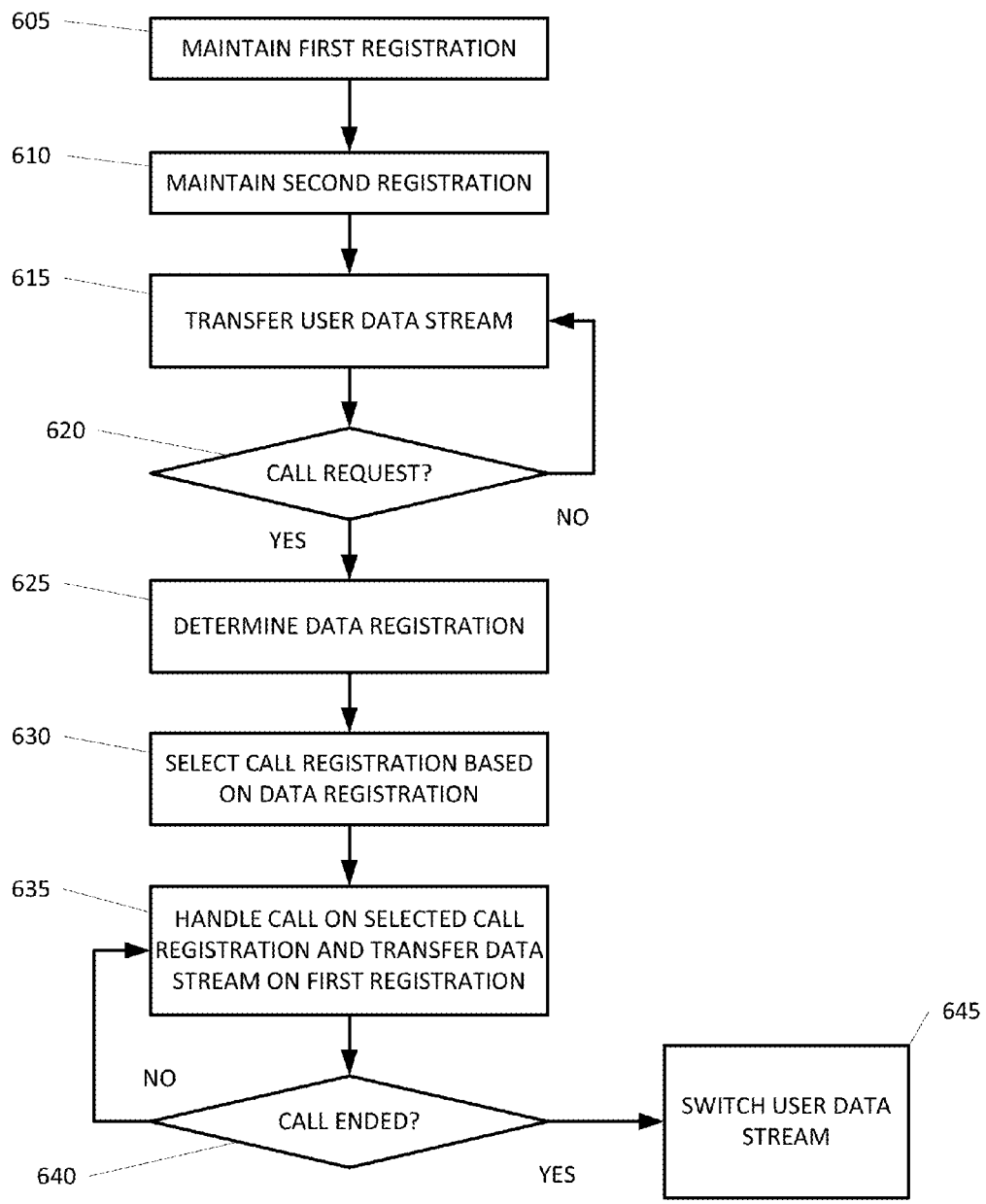
FIG. 6 is a flowchart illustrating another method for switching a registration for a data transfer that may be performed by the mobile device of FIG. 1, according to an embodiment.

Turning to FIG. 6, a flowchart 600 illustrates another method for switching a registration for a data transfer that may be performed by the mobile device 130. The mobile device 130 maintains (605) a first registration as a 3G registration with the first wireless network 110. The mobile device 130 maintains (610) a second registration as a 2G registration with the second wireless network 120. The mobile device 130 transfers (615) a current user data stream using a data registration (i.e., one of the first registration or the second registration).

While transferring the user data stream, the mobile device 130 determines (620) whether a call request has been received. If no call request has been received (NO at 620), then the mobile device 130 continues to transfer the user data stream with the second registration. Upon receipt of the call request (YES at 620), the mobile device 130 determines (625) the data registration for the user data stream.

The mobile device selects (630) a call registration for handling the call based on the data registration. If the data registration is the first registration (e.g., the 3G registration), then the first registration or the second registration can be used for the call without changing the data registration. In this case, the mobile device 130 can be either a DSDS device or a DSDA device and the mobile device 130 prompts the user to select the first registration or the second registration as the call registration (analogous to prompt 325). If the data registration is the second registration (e.g., the 2G registration) and the mobile device 130 is a DSDS device, then the mobile device 130 prompts the user to select the first registration as the call registration to allow concurrent handling of the call and the current user data transfer.

The mobile device 130 handles (635) the call on the selected call registration. If the selected call registration is the second registration and the data registration is the second registration, then the mobile device 130 switches the data registration to the first registration. If the data registration is the first registration, then no switch is needed. If the selected call registration is the first registration and the data registration is the first registration, then no switch is needed. If the selected call registration is the first registration and the data registration is the second registration, then the mobile device 130 switches the data registration to the first registration.

The mobile device 130 determines (640) whether the call has been terminated. If the call has not ended (NO at 640), the mobile device 130 continues to handle (635) the call and the user data stream. Upon termination of the call (YES at 640), the mobile device 130 switches (645) the user data stream back to its original registration (e.g., from the first registration back to the second registration if it originated on the second registration).

Figure 5A:
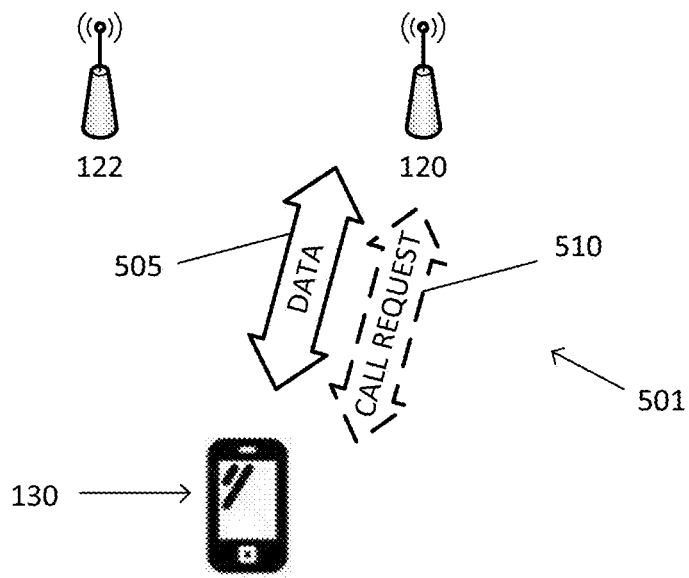
FIG. 5A and FIG. 5B are diagrams illustrating communication paths between the mobile device of FIG. 1 and wireless networks of the communication system of FIG. 1, according to various embodiments.
Figure 5B:
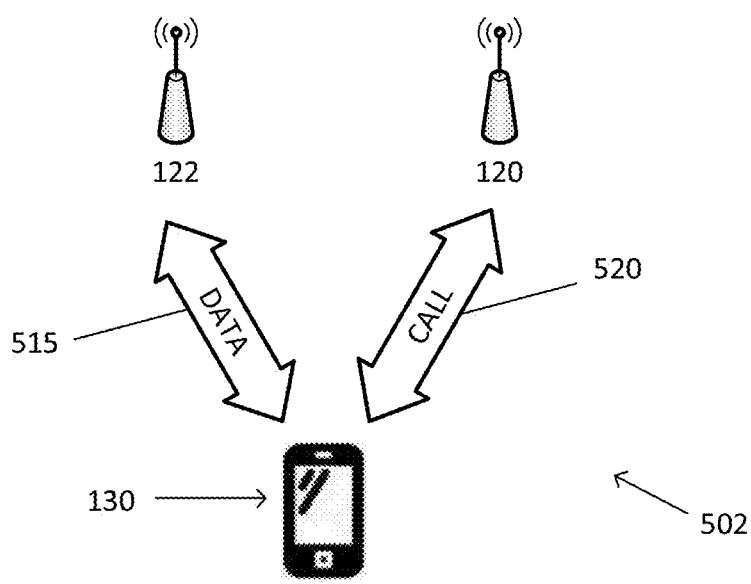
Figure 7:
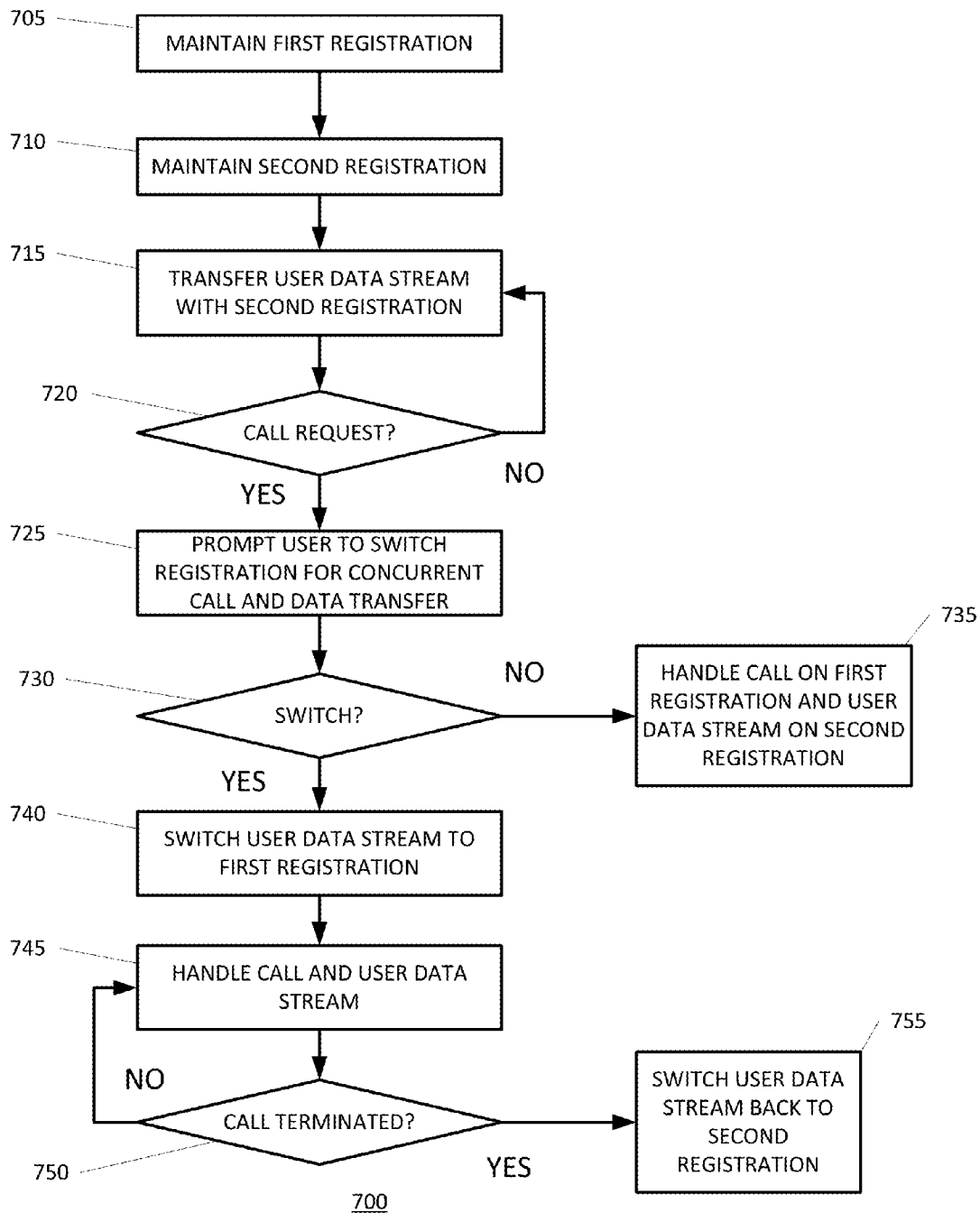
FIG. 7 is a flowchart illustrating yet another method for switching a registration for a data transfer that may be performed by the mobile device of FIG. 1, according to an embodiment.

Turning to FIG. 7, a flowchart 700 illustrates yet another method for switching a registration for a data transfer that may be performed by the mobile device 130. Turning to FIG. 5A and FIG. 5B, diagrams 501 and 502 illustrate examples of communication paths according to an embodiment. Steps 705, 710, 715, 720, 725, 730, 740, 745, 750, and 755 can proceed analogously to steps 305, 310, 315, 320, 325, 330, 340, 345, 350, and 355 as described above. However in this embodiment, the first registration can be a 2G registration with the third wireless network 122, the second registration can be a 2G registration with the second wireless network 120, and the mobile device 130 can be a DSDA device. As a DSDA device, the mobile device 130 is capable of transferring a user data stream or a call via the first registration while handling a call or user data stream via the second registration.

The mobile device 130 handles the user data stream via communication path 505 to the second wireless network 120. If the user declines the prompt to switch (NO at 730), then the mobile device 130 can handle the call on the second registration (via the communication path 520) and the user data stream on the first registration (via the communication path 515). Thus, the mobile device 130 switches the user data stream from the second registration to the first registration and concurrently handles the call and the user data stream.

Figure 8:
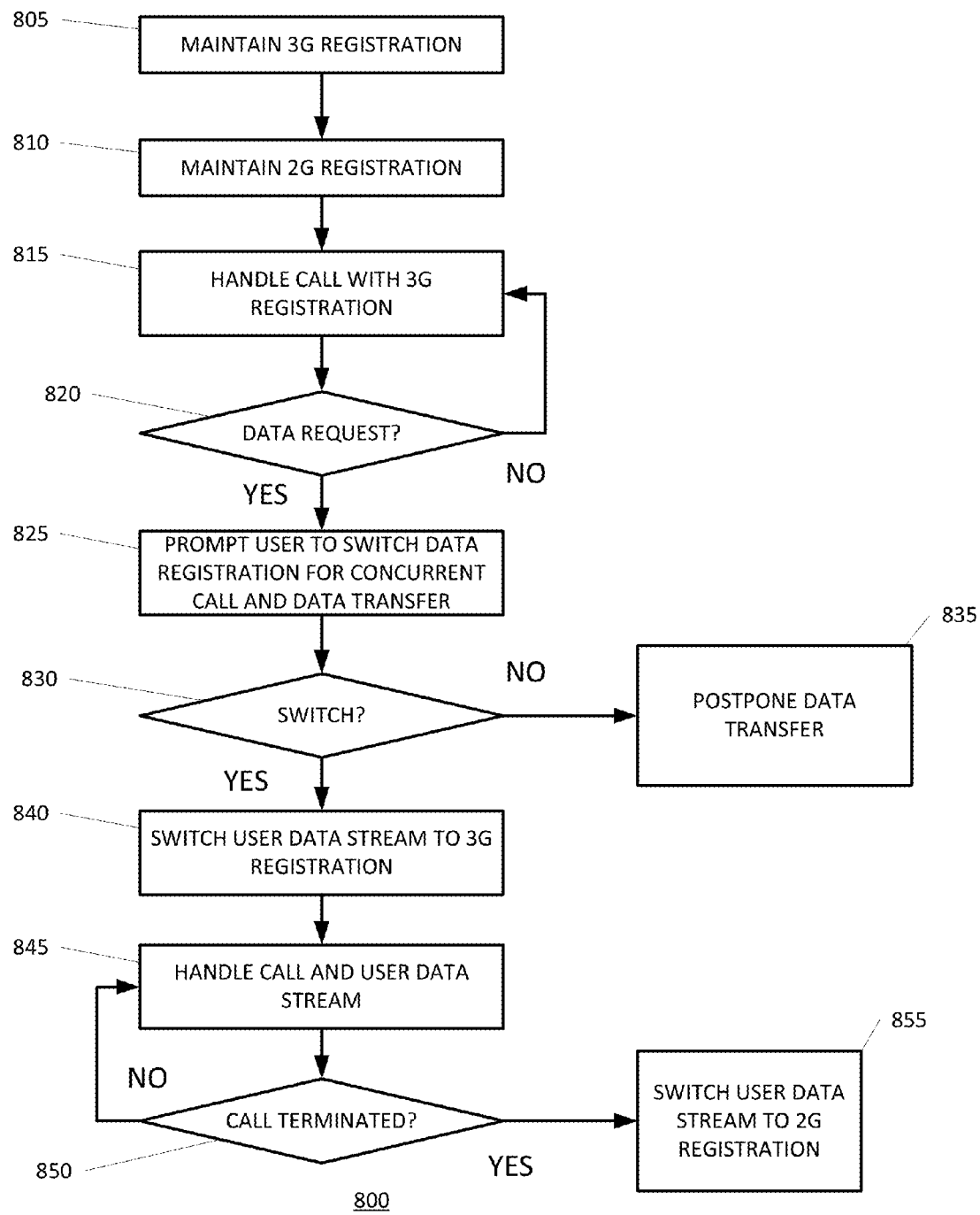
FIG. 8 is a flowchart illustrating a method for switching a registration for a data transfer that may be performed by the mobile device of FIG. 1, according to an embodiment.

Turning to FIG. 8, a flowchart 800 illustrates a method for switching a registration for a data transfer that may be performed by the mobile device 130. While FIG. 3 illustrates a user data stream that is being transferred upon receipt of a call request, in another embodiment the mobile device 130 handles a call and receives a request for a user data transfer. In this case, the mobile device 130 can prompt the user to switch the data registration for the user data transfer based on the call registration for the call.

The mobile device 130 maintains (805) a first registration with the first wireless network 110 for the first subscription. The mobile device 130 maintains (810) a second The mobile device 130 handles a call using first registration as the call registration (a 3G registration). Upon receipt (820) of a request for a data transfer on the second registration (a 2G registration), the mobile device 130 prompts (825) the user to switch the data registration from the second registration to the first registration. The mobile device 130 can prompt the user for the switch or automatically switch the data registration.

If the user accepts the prompt or has provided a preselected user preference to switch the user data stream (YES at 830), the mobile device 130 switches (840) the user data stream from the second registration to the first registration. Where the user has provided a preselected user preference, the mobile device 130 automatically switches the user data stream (e.g., without user interaction during the call). In this case, the user's experience may be improved by avoiding disruption of the call. The mobile device 130 then handles (845) the user data stream with the first registration concurrently with a call for the call request on the first registration.

The mobile device 130 determines (850) whether the call has been terminated. If the call has not ended (NO at 850), the mobile device 130 continues to handle (845) the call and the user data stream. Upon termination of the call (YES at 850), the mobile device 130 switches (855) the user data stream from the first registration to the second registration. In other embodiments, the mobile device 130 can prompt the user to switch the user data stream upon termination of the call or provide a user interface for a preselected user preference for the switch.

Figure 9:
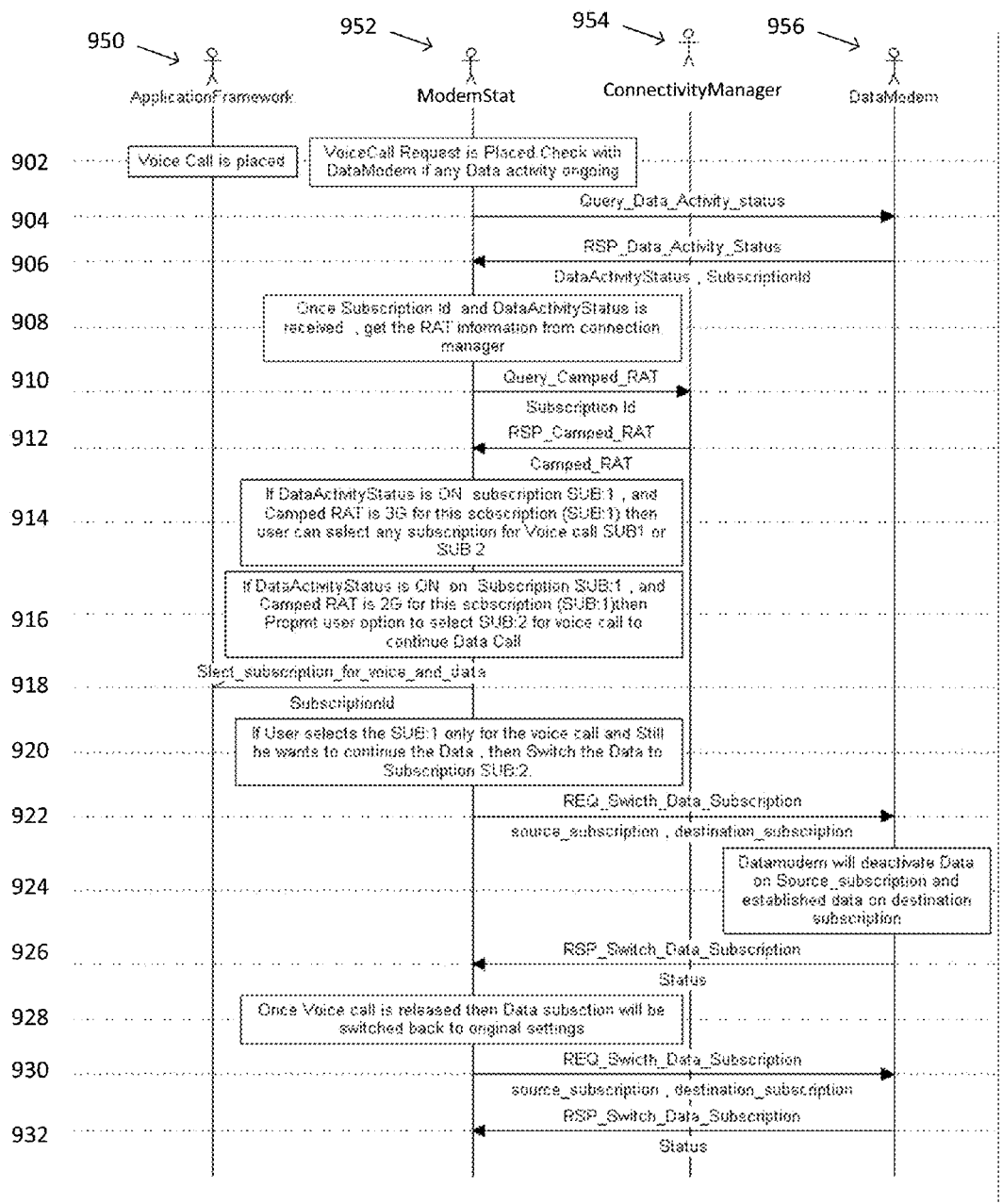
FIG. 9 is a flowchart illustrating another method for switching a registration for a data transfer that may be performed by the mobile device of FIG. 1, according to an embodiment.

Turning to FIG. 9, a flowchart 900 illustrates another method for switching a registration for a data transfer that may be performed by the mobile device 130. In this embodiment, the mobile device 130 uses an Android operating system and thus includes an ApplicationFramework 950, a ConnectivityManager 654, and DataModem 956 components. The mobile device 130 also executes a ModemStat application 952. The ApplicationFramework 950 receives (902) a request for a voice call and notifies the ModemStat application 952, which determines whether a current user data transfer is ongoing. The ModemStat sends (904) a Query_Data_Activity Status message to the DataModem 956. The DataModem 956 returns (906) a response RSP_Data_Activity_Status that includes a DataActivityStatus and a SubscriptionID. The SubscriptionID corresponds to a SIM, such as the SIM-A 210 or SIM-B 220.

The ModemStat application 952 determines (908) a radio access technology for the SIM identified by the DataModem. The ModemStat application 952 sends (910) a Query_Camped_RAT message to the ConnectivityManager 954 and receives (912) a RSP_Camped_RAT message that indicates a Camped_RAT (e.g., 2G or 3G). If the DataActivityStatus is "ON" for the first subscription and the Camped_RAT is 3G, then the mobile device 130 can prompt (914) the user for any subscription for handling the voice call (e.g., the first subscription or the second subscription). If the DataActivityStatus is "ON" for the first subscription and the Camped_RAT is 2G, then the mobile device 130 prompts (916) the user to select the second subscription for the voice call in order to continue the data transfer.

The user selects the subscription for voice call (e.g., via the user interface 208) and the ModemStat application 952 receives (918) a selected SubscriptionID from the ApplicationFramework 950. If the user has selected the first subscription for the voice call and still wishes to continue the user data stream, then the ModemStat application 952 switches (920) the data registration to the second subscription. The ModemStat application 952 sends (922) a REQ_Switch_Data Subscription message to the DataModem 956, which includes a source_subscription identifier (e.g., the first subscription) and destination_subscription identifier (e.g., the second subscription). The DataModem 956 deactivates (924) the data stream identified by the source_subscription identifier and establishes a new data stream with the destination_subscription identifier. The DataModem 956 responds (926) with a RSP_Switch_Data Subscription message that includes a status of the switch (e.g., successful or failed).

The ModemStat application 952 determines (928) whether the call has been terminated in order to switch the data transfer back to the source subscription. The ModemStat application 952 sends (930) a REQ_Switch_Data Subscription message with a source_subscription identifier (e.g., the second subscription) and a destination_subscription identifier (e.g., the first subscription) to the DataModem 956. The DataModem 956 switches (932) the data stream back to the first subscription and sends a RSP_Switch_Data Subscription message back to the ModemStat application 952 that includes a status of the switch.

It can be seen from the foregoing that a method and system for switching a registration for a data transfer. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

We claim:

1. A method on a mobile device for switching a registration for a data transfer, the method comprising:
   maintaining a first registration of the mobile device with a first wireless network for a first subscription;
   maintaining a second registration of the mobile device with a second wireless network for a second subscription, wherein the first registration is concurrent with the second registration; transferring a user data stream with the second registration; and
   switching the user data stream from the second registration to the first registration based on a receipt of a call request so that the user data stream is handled by the first registration concurrently with the call request that is handled by the first registration or the second registration.

2. The method of claim 1, wherein switching the user data stream comprises automatically switching the data user data stream upon receipt of the call request.

3. The method of claim 1, wherein the call request corresponds to the first registration, the method further comprising:
  transferring the user data stream with the first registration and concurrently handling a call for the call request with the first registration.

4. The method of claim 3, wherein maintaining the first registration comprises camping on a 3G-compatible wireless network with a first subscriber identity module of the mobile device; and
  wherein maintaining the second registration comprises camping on a 2G-compatible wireless network with a second subscriber identity module of the mobile device.

5. The method of claim 1, wherein the call request corresponds to the second registration, the method further comprising:
  transferring the user data stream with the first registration and concurrently handling a call for the call request with the second registration.

6. The method of claim 5, wherein the second wireless network is a 2G-compatible wireless network.

7. The method of claim 1, wherein switching the user data stream comprises prompting a user of the mobile device for a registration selection to handle the call request.

8. The method of claim 1, further comprising switching the user data stream from the first registration back to the second registration upon termination of a call for the call request.

9. A method on a mobile device, the method comprising:
  maintaining a first registration of the mobile device with a 3G-compatible wireless network for a first subscription and concurrently maintaining a second registration of the mobile device with a 2G-compatible wireless network for a second subscription;
  determining a data registration for a current user data transfer of the mobile device as one of the first registration or the second registration upon receipt of a call request;
  selecting a call registration as one of the first registration or the second registration based on the data registration;, and
  handling a call for the call request using the call registration so that the user data registration is handled by the first registration concurrently with the call request that is handled by the first registration or the second registration.

10. The method of claim 9, wherein selecting the call registration comprises automatically selecting the call registration based on the data registration and a preselected user preference upon the determination of the data registration.

11. The method of claim 9, wherein the mobile device is a dual subscriber identity module dual standby ("DSDS") device and selecting the call registration comprises prompting a user of the mobile device to switch the current user data transfer to the first registration if the data registration is the second registration.

12. The method of claim 9, wherein the mobile device is a dual subscriber identity module dual active ("DSDS") device and selecting the call registration comprises prompting a user of the mobile device to select the first registration as the call registration to allow concurrent handling of the call and the current user data transfer if the data registration is the second registration.

13. A method on a mobile device for switching a registration for a user data stream, the method comprising:
  maintaining a 3G registration of the mobile device with a first wireless network for a first subscription;
  maintaining a 2G registration of the mobile device with a second wireless network for a second subscription, wherein the first registration is concurrent with the second registration; handling a call with the 3G registration;
  receiving a request for a user data stream with the 2G registration;
  switching the user data stream from the 2G registration to the 3G registration; and
  handling the call and the user data stream concurrently with the 3G registration.

14. A mobile device for a wireless network, the mobile device comprising:
  a non-transitory memory; a processor configured to retrieve instructions from the memory; and a first subscriber identity module ("SIM") and a second SIM;
  wherein the mobile device is configured to:
  maintain a first registration with a first wireless network for the first SIM; maintain a second registration with a second wireless network for the second SIM concurrently with the first registration;
  transfer a user data stream with the second registration; and
  switch the user data stream from the second registration to the first registration based on a receipt of a call request so that the user data stream is handled bY the first registration concurrently with the call request that is handled by the first registration or the second registration.

15. The mobile device of claim 14, wherein the mobile device is configure to automatically switch the data user data stream upon receipt of the call request.

16. The mobile device of claim 14, wherein the call request corresponds to the first registration; and
  wherein the mobile device is configured to transfer the user data stream with the first registration and concurrently handle a call for the call request with the first registration.

17. The mobile device of claim 16, wherein the mobile device is configured to camp on a 3G-compatible wireless network with the first SIM; and
  wherein the mobile device is configured to camp on a 2G-compatible wireless network with the second SIM.

18. The mobile device of claim 14, wherein the call request corresponds to the second registration; and
  wherein the mobile device is configured to transfer the user data stream with the first registration and concurrently handle a call for the call request with the second registration.

19. The mobile device of claim 14, wherein the mobile device is configured to prompt a user of the mobile device for a registration selection of either the first registration or the second registration to handle the call request.

20. The mobile device of claim 14, wherein the mobile device is configured to switch the user data stream from the first registration back to the second registration upon termination of a call for the call request.

* * * * *